Figure 1:
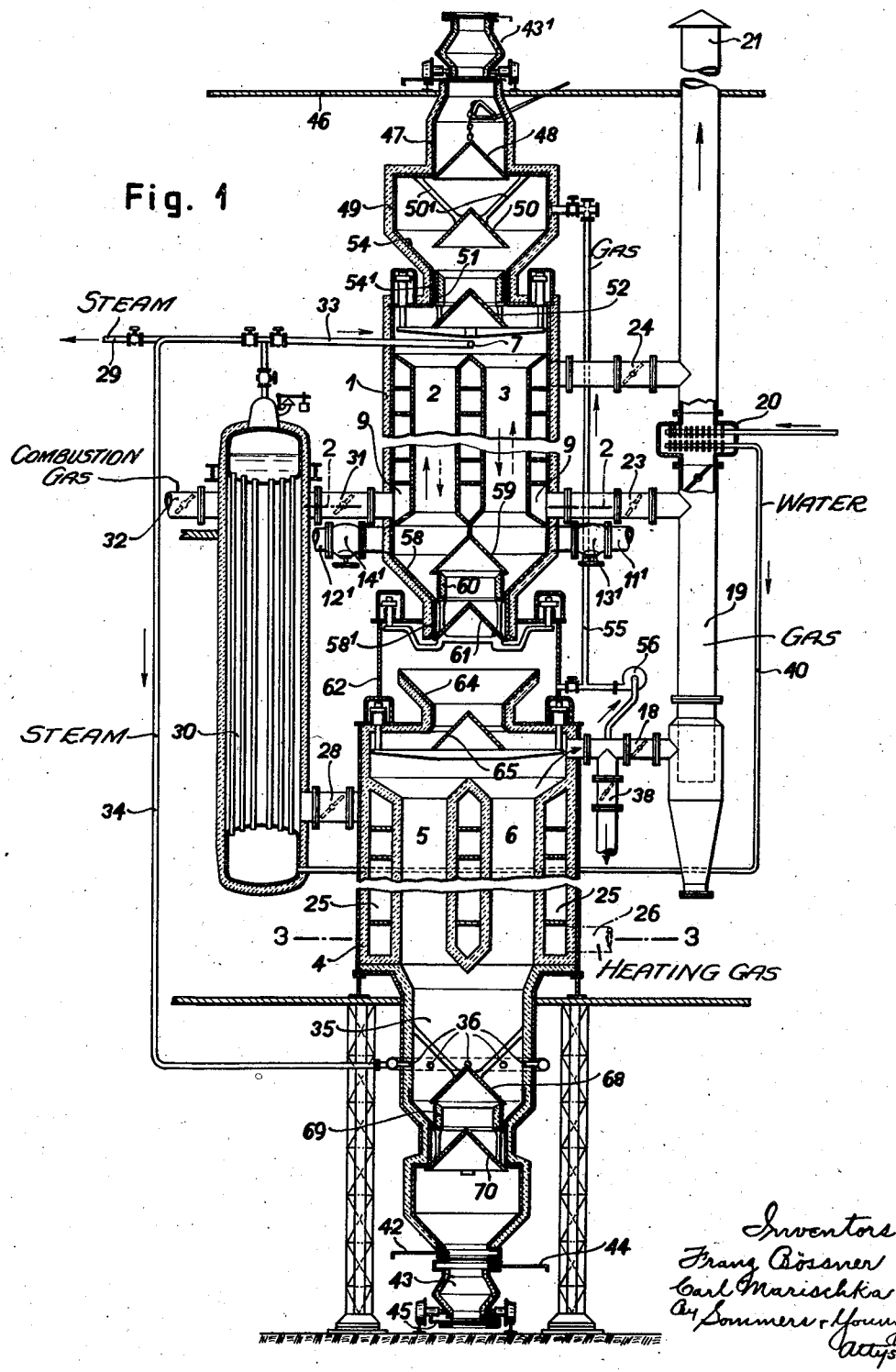

Dec. 12, 1939.   F. BÖSSNER ET AL   2,183,301
PROCESS FOR CONVERTING GASES CONTAINING CARBON MONOXIDE
Filed Oct. 28, 1936   4 Sheets-Sheet 1

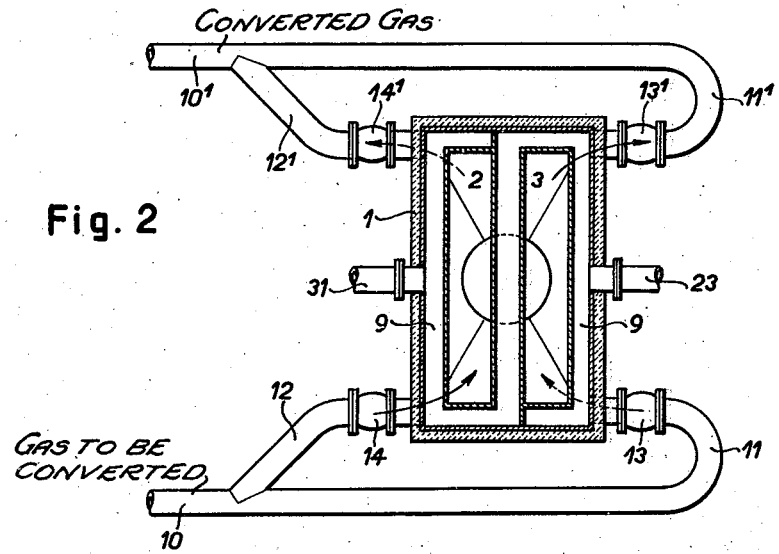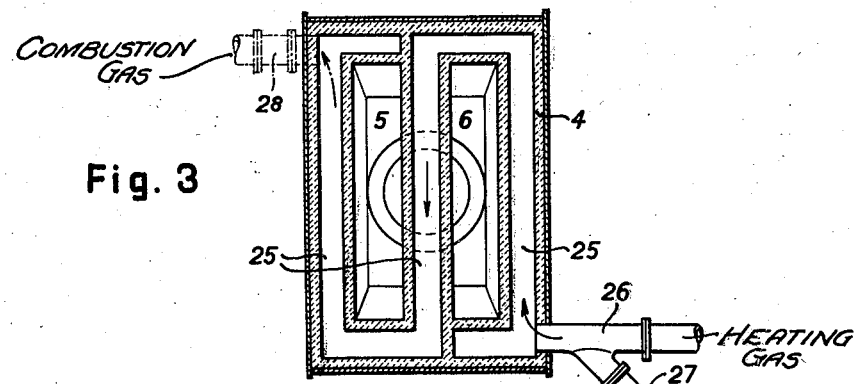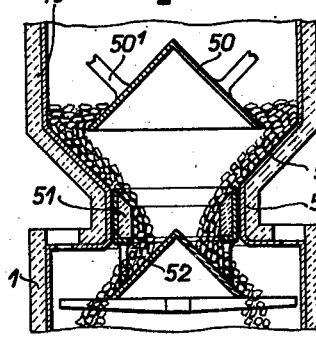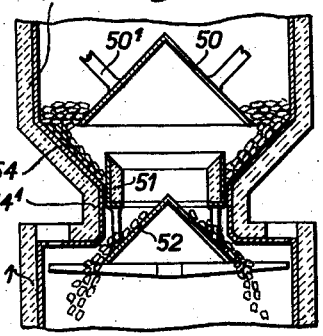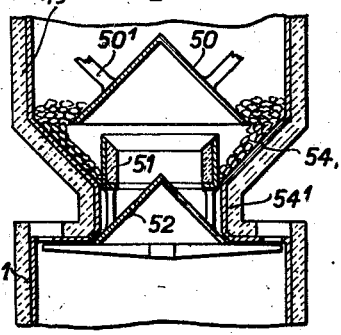

Dec. 12, 1939.   F. BÖSSNER ET AL   2,183,301
PROCESS FOR CONVERTING GASES CONTAINING CARBON MONOXIDE
Filed Oct. 28, 1936   4 Sheets-Sheet 3

Patented Dec. 12, 1939

2,183,301

UNITED STATES PATENT OFFICE 2,183,301

PROCESS FOR CONVERTING GASES CONTAINING CARBON MONOXIDE

Franz Bössner and Carl Marischka, Vienna, Austria

Application October 28, 1936, Serial No. 108,070
In Austria November 4, 1935

5 Claims. (Cl. 23—213)

This invention relates to a process and to apparatus for converting gases containing carbon monoxide by transforming the carbon monoxide into carbon dioxide and hydrogen in the presence of steam and of a reactant, the latter being regenerated, that is, freed from the carbon dioxide absorbed by the same by heating it. The invention is especially applicable for depoisoning city-gas by converting the poisonous carbon monoxide into non-poisonous gases. The invention is moreover applicable for producing gases useful for the synthetic production of ammonia and gasoline, the invention enabling the regulation of the ratio between the contents of CO and H in the gas in the manner required for these purposes.

In the known plants for carrying out conversions of the kind referred to above the transformation of the CO and the regeneration of the reactant is effected in the same chamber. Therefore, when the reactant is to be regenerated, the conversion of the gas has to be interrupted and furthermore the reactant must be heated periodically to a temperature which is considerably higher than that required for the conversion of the gas. If it is desired to carry out the process of conversion in a continuous manner it is necessary to provide two or more chambers in which the conversion takes place whereby the plant is rendered complicated and expensive. Moreover, considerable losses of heat cannot be avoided.

The main object of our invention is to carry out the said gas conversion, as well as the regeneration of the reactant continuously and in such a manner that the heat required for the whole process is reduced to a minimum and the installation is rendered simple as far as possible. With this end in view the present invention comprises repeatedly circulating the reactant in a hot state by feeding the same from the chamber for the gas conversion into another chamber wherein the reactant is regenerated, and refeeding the same therefrom into the conversion chamber.

By means of such circulation of the reactant in a hot state a continuous process is obtained in which the conversion chamber, as well as the regeneration chamber is maintained at different, but constant temperatures. For instance the temperature in the conversion chamber amounts to 350 to 400° C. and that in the regeneration chamber to about 800° C. Such a continuous process is advantageous in many respects. First of all, a considerable amount of heat is saved, since the reactant is always hot and therefore need not be heated after each regeneration. The heat required is furthermore reduced by the temperatures in the conversion chamber and in the regeneration chamber being maintained constant. Moreover, by the circulation of the reactant the advantage is obtained that the gas to be converted is always brought into contact with fresh and active reactant, so that not only the conversion of the CO is effected in a rapid, uniform and complete manner, but also the $CO_2$ formed during this conversion is completely or partly removed from the gas since the active reactant permanently absorbs the $CO_2$ from the gas.

For carrying out this process reactants effecting the conversion of the CO and the absorption of the $CO_2$ at relatively low temperatures, such as below about 500° C. are particularly suitable. Such a reactant is for instance the mineral ankerite that is a natural composition of iron, lime and magnesia, the iron contained therein serving to convert the CO, whilst the lime serves to absorb the $CO_2$ formed during this conversion. This reactant therefore has a favorable dual action.

Figure 4:
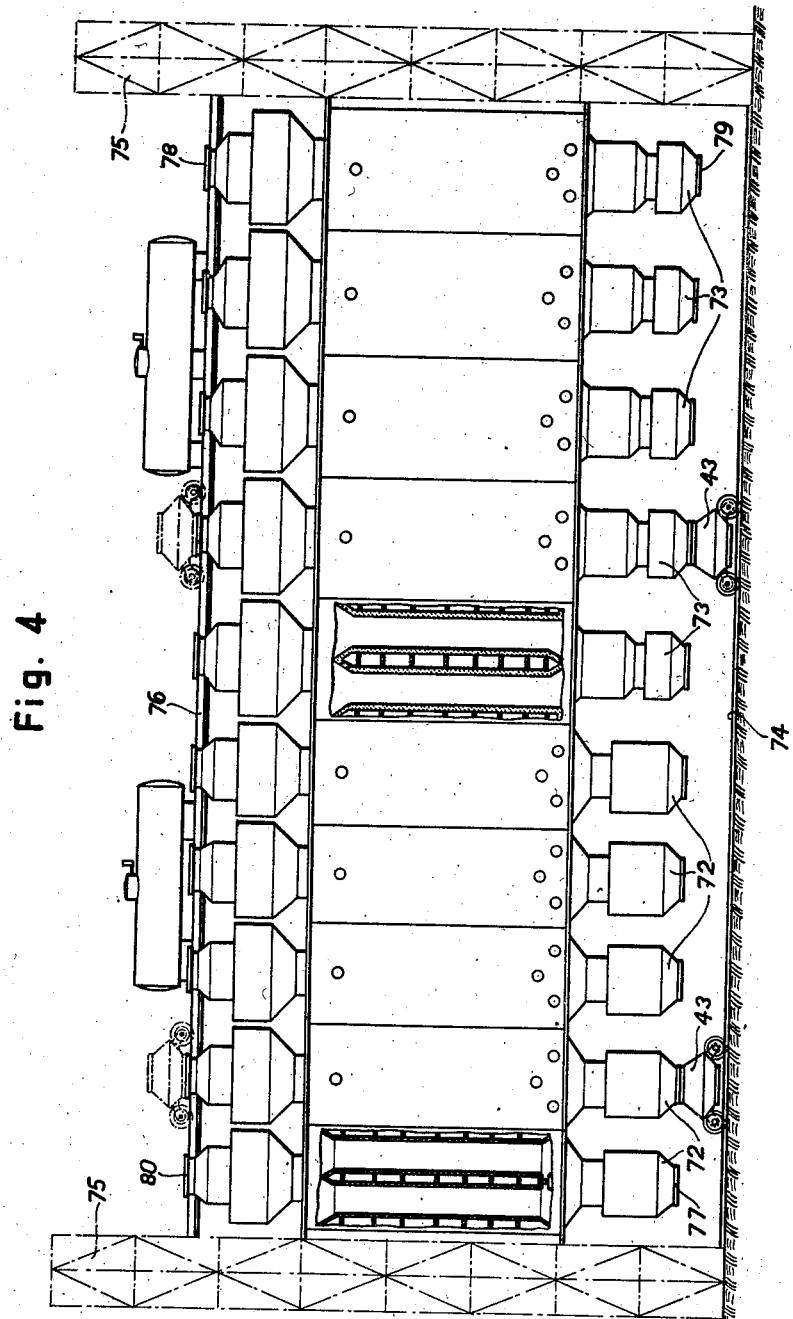
Figure 5:
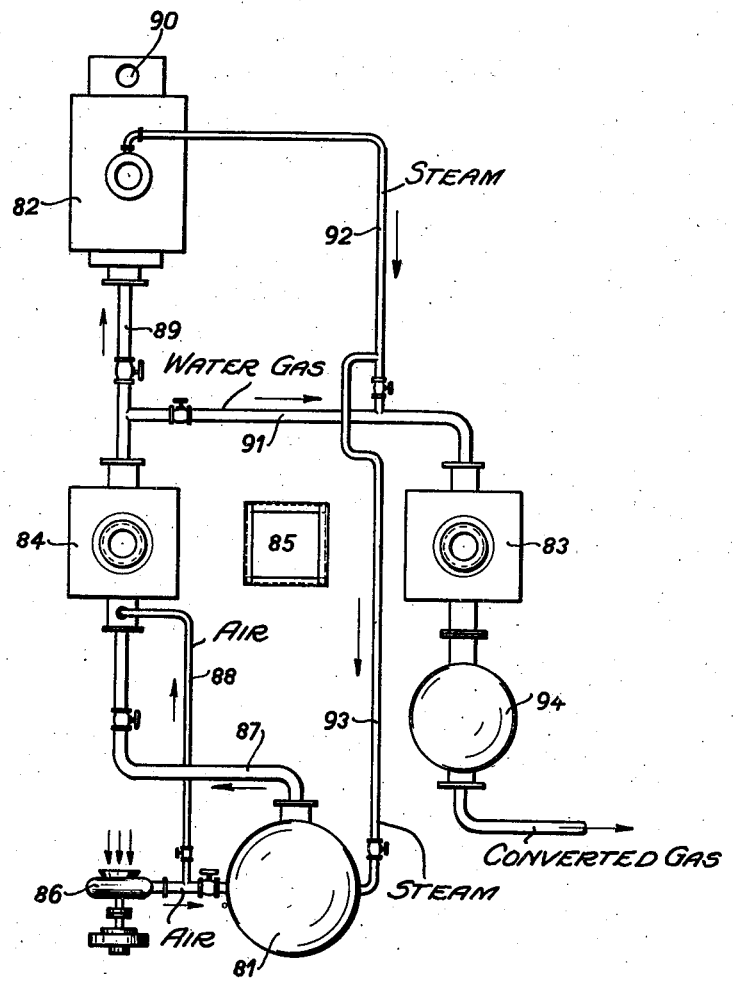

The present invention is illustrated by way of example in the accompanying drawings, in which Fig. 1 is a vertical section through a combined converter and regenerator constructed according to the invention, Fig. 2 is a section on line 2—2 of Fig. 1, Fig. 3 is a section on line 3—3 of Fig. 1, Fig. 4 is a view of a battery consisting of a plurality of converters and regenerators, one converter and one regenerator being shown in section, Fig. 5 is a diagrammatic plan view of a plant for the conversion of water gas, and Figs. 6, 7 and 8 show in vertical sections a detail of Fig. 1 in three different positions.

The device shown in Figs. 1 to 3 comprises a converter 1, the interior of which is subdivided into two chambers 2 and 3 in which the conversion of the CO and the absorption of the $CO_2$ takes place in the presence of steam and of the reactant contained within these chambers. Below the converter 1 is arranged the regenerator 4 likewise subdivided into two chambers 5 and 6 in which the regeneration of the reactant is effected. The conversion chambers 2, 3 are surrounded by flues 9 which are passed by a heating medium or by a cooling medium to heat or to cool these chambers respectively, as will be described hereinafter. Similar flues 25 serve to heat the regeneration chambers 5, 6.

By means of feeding and shut-off devices more fully described later on, certain quantities of the reactant contained within the conversion chambers 2, 3 are periodically fed from the converter 1 into the regenerator 4, as the reactant becomes inactive due to the absorption of $CO_2$. The regenerated reactant falls from the regenerator 4 into a transport wagon 43. This container is moved to a vertical lift or elevator (not shown) which lifts the container to the plane of the charging platform 46 on which the container assumes the position 43'. Then the reactant falls again into the converter 1 and this circulation is repeated many times.

The heating of the regenerator (for instance to 800° C.) is effected by means of a heating gas, for instance generator gas, supplied through the pipe 26. Immediately before the entrance of this pipe into the flues 25 an air supply pipe 27 (Fig. 3) opens into the pipe 26. The mixture of heating gas and air is burned in the flues 25 whereby the reactant contained within the chambers 5, 6 is heated up to the regeneration temperature. The hot combustion gases leave the flues 25 through the pipe 28 and are conducted into the waste heat steam boiler 30 in which their heat is utilized for the production of steam. The feed water is supplied to the boiler 30 through the pipe 40 from the economiser 20 in which the water is preheated. The combustion gases partly cooled in the boiler 30 are discharged through the pipe 32 into the open air, or are conducted through the conduit 31 into the flues 9 of the converter 1 in order to heat the chambers 2 and 3.

The steam generated in the boiler 30 is conducted through the pipe 34 into the lower part 35 of the regenerator 4 into which it enters through a plurality of openings 36. By means of this steam the reactant regenerated in the chambers 5, 6 and descending into the lower part 35 is cooled from the high regeneration temperature (for instance 800° C.) to a temperature (for instance 400° C.) which is somewhat higher than that at which the conversion of CO and the absorption of $CO_2$ is effected in the converter 1. By this means the unavoidable loss of heat occurring during the transportation of the reactant from the regenerator 4 to the converter 1 is compensated and the reactant entering into the chambers 2, 3 already has the temperature required for the reactions which take place in these chambers.

It will therefore be seen that the reactant is in a hot state during its whole circulation and that it is not necessary to heat up the regenerated reactant before introduction into the converter 1 so that the process is rendered much more economical.

The cooling of the reactant within the lower part 35 may be effected by means of a cooling medium other than steam, for instance air or an inert gas. The use of steam as cooling medium, however, results in the advantage that the presence of steam in the chambers 5, 6 into which it rises from the lower part 35 assists and accelerates the regeneration of the reactant.

Any excess of steam may be discharged from the boiler 30 through the pipe 29 in order to use the same for any other purposes desired. A part of the steam is conducted through the pipe 33 into the converter 1 into which it enters at 7.

At the beginning of the process the converter 1 is heated up to the required conversion temperature (for instance 350° C.) by the hot combustion gases supplied through the pipe 31 into the flues 9. During the further run of the process the thermal conditions existing within the converter depend on the nature of the reactant used. For maintaining the required conversion temperature constant the chambers 2, 3 are to be continuously heated or cooled, according to whether the reaction taking place therein is endothermic or exothermic.

A permanent heating of the chambers 2, 3 may be obtained by the hot combustion gases entering into the flues 9 through the pipe 31, or by the hot gases which leave the regeneration chambers 5, 6 through the pipe 18. The last mentioned gases are partly discharged into the chimney 21 after they have transmitted their heat to the economiser 20. If it is desired to utilize the carbon dioxide driven out of the reactant in the chambers 5, 6 for other purposes, the gas leaving the regenerator 4 is discharged through the pipe 38. By suitable setting of regulating or shut-off members (valves) a part of these gases may be supplied through the pipe 23 into the flues 9, from which they are discharged through the pipe 24. If the reactant is of such a character that an exothermic process takes place in the converter the heat produced is carried away by passing a cooling medium, such as air or steam, through the flues 9.

By this means the temperatures in the regenerator 4, as well as in the converter 1 are maintained constant during the whole process and the processes in the converter and in the regenerator are carried out in a continuous manner so that the amount of heat required is reduced and the process is rendered more economical.

The gas to be converted is supplied to the converter 1 through the conduit 10 (Fig. 2) which branches into the pipes 11 and 12 opening into the converter 1 beneath the chambers 2, 3 at opposite corners. At the other two corners open similar pipes $11^1$, $12^1$ which are united into the discharge conduit $10^1$. According to the position of the valves 13 and 14 the gas to be converted enters into the converter 1 through the pipe 11 or 12 alternatively. When the gas enters through the pipe 12 it flows according to the arrows indicated in full lines (Figs. 1, 3). The gas flows upwards in the chamber 2 in which it is preheated by the hot reactant. Then it flows from the chamber 2 to the chamber 3 and comes into contact with the steam entering at 7. The steam is carried by the gas into the chamber 3 and the mixture of gas and steam flows downwards in the chamber 3 in which CO is converted and $CO_2$ formed thereby is absorbed by the reactant. The converted gas is discharged through the pipe $11^1$ and then through the conduit $10^1$.

After a certain period of time the valves 13, 14, $13^1$, $14^1$ are switched over and the gas then enters through the pipe 11 into the chamber 3 and flows according to the arrows indicated in dash lines into the chamber 2, then leaves the converter 1 through the pipe $12^1$ and is discharged through the conduit $10^1$. In this case therefore the gas is preheated in the chamber 3, whilst the conversion of CO and the absorption of $CO_2$ is effected in the chamber 2. By means of this alternating operation the amount of heat required is further reduced.

The feeding and shut-off devices by means of which certain amounts of the reactant are periodically fed into the converter 1 and from the latter into the regenerator 4 and discharged from the latter are arranged and constructed as follows.

At the top of the converter 1 there is arranged a bunker 47 and an intermediate bunker 49 having a sloped bottom 54 is located beneath the converter. A vertically reciprocatable valve or cone 48 is provided between both bunkers. In the center of the intermediate bunker 49 is provided a stationary distributing member 50 having the shape of a cone, roof, or pyramid. This member is carried by the arms $50^1$ and distributes and deflects outwardly the reactant falling down from the bunker 47. The inclined bottom 54 merges into a circular neck portion $54^1$ within which a cylindrical sleeve 51 is slidable in a vertical direction. A valve or cone 52 may bear against the lower edge of the neck portion 54¹ thus separating the intermediary bunker 49 from the converter 1.

The feeding and shut-off device above referred to is illustrated more clearly in the Figs. 6, 7 and 8 in three different positions. According to Fig. 6 the sleeve 51 and the cone 52 assume their lowest position in which the reactant falls down from the intermediary bunker 49 into the converter 1. According to Fig. 7 the sleeve 51 and the cone 52 assume an intermediate position in which the upper part of the sleeve prevents the reactant sliding downwards on the bottom 54 from further falling down. According to Fig. 8 the sleeve 51 and the cone 52 are in their upper position in which the cone 52 bears against its seat thus effecting a gas tight seal between the intermediate bunker 49 and the converter 1. As it will be seen the purpose of the sleeve 51 is to intercept the falling down of the reactant before the cone 52 bears against its seat whereby clogging or jamming of particles of the catalyst between the cone 52 and its seat is avoided and therefore a gas-tight seal is effected by this cone.

The cone 52 and the sleeve 51 are raised and lowered at certain intervals by means of a device which may be constructed in any desired manner and need not be described in detail. This device is preferably automatically actuated so as to feed certain amounts of reactant into the converter 1 at certain intervals of time.

In order to prevent the gas from flowing from the converter 1 into the intermediate bunker 49, when the cone 52 is in its open position or when it is closed, but does not afford a complete gas-tight seal, means are provided which will now be described. A part of the gas (mixture of CO₂ and steam) leaving the regenerator 4 may be drawn off from the conduit 18 by means of the exhaustor 56 (Fig. 1) and pressed into the intermediate bunker 49 through the pipe 55. By this means this bunker is permanently set under pressure so that CO₂ may flow from the bunker 49 into the chambers 2, 3 (which is not objectionable), but gases are prevented from flowing from these chambers into the bunker 49. The bunker 49 may also be set under pressure by means of steam or another inert gas.

The converter 1 has an inclined bottom 58 merging into a circular neck portion 58¹. A sleeve 60 cooperating with a stationary distributing member 59 and a cone 61 operate in the same manner as the analogous members 50, 51 and 52. The reactant falling down from the converter 1 comes into an intermediate bunker 62 and passes through a hopper 64 into the regenerator 4. The hopper 64 may be shut off on its underside by means of a cone 65. On the bottom of the lower part 35 of the regenerator 4, there are provided a stationary distributing member 68, a sleeve 69 and a cone 70. These members also operate in the same manner as the members 50, 51 and 52. The reactant falling down from the lower part 35 comes into an intermediate bunker 41 wherefrom it falls into the receptacle 43 if the slide 42 is in its open position. The receptacle 43 is provided with an upper slide 44 and a lower slide 45.

All feeding and shut-off devices above referred to operate in such a timed relation that the reactant is removed from the converter 1 as it becomes inactive, and is substituted by regenerated reactant. The gas to be converted therefore always comes into contact with reactant which is fully active or efficient and causes a complete conversion of CO and absorption of CO₂.

According to Fig. 4 the converters and regenerators are arranged not one above the other, but side by side. In the example shown in the drawings there are provided five converters 72 and five regenerators 73. One of the converters and one of the regenerators are shown in vertical section. The construction of the converters and regenerators is substantially the same as that of the converter 1 and regenerator 4 according to Figs. 1 to 3 and therefore need not to be described. Below the converters 72 and regenerators 73 a track 74 is arranged upon which one or more transport receptacles 43 move. Two vertical lifts or elevators 75 serve to lift the receptacles 43 and above the converters and regenerators there is arranged a second track 76, upon which the lifted receptacles move to the desired converter or regenerator.

The reactant falling from the outlet 77 of a converter 72 into a receptacle 43 is conveyed to the inlet 78 of a regenerator 73 and the regenerated reactant falling from the outlet 79 of a regenerator 73 is conveyed to the inlet 80 of a converter 72 so that the reactant makes a circulation in a hot state also in this case. As it will be seen the feeding device for the reactant comprising the receptacles 43, tracks 74 and 76 and the elevators 75 is common to all converters and regenerators so that the reactant discharged from any desired converter 72 may be supplied to any desired regenerator 73 and vice versa. By this means heat losses of the reactant are avoided as much as possible and the amount of heat required is reduced to a minimum, since the reactant may be fed into that converter or regenerator which at the given moment requires a supply of the reactant.

As shown in Fig. 4, the converters 72 and regenerators 73 are subdivided each into two chambers, similarly as in Figs. 1 to 3. Alternatively the converters and regenerators may each be also provided each with a single chamber and two adjacent converters 72 may be connected with one another and operate like a single converter having two chambers.

Fig. 5 shows a diagrammatic plan view of an installation of apparatus serving for the conversion of water gas into a gas with a high percentage of hydrogen. For the sake of clearness the usual devices for cleaning the gases and the usual heat exchange apparatus are omitted.

The water gas generator 81 is provided with a waste heat-steam boiler 82 for utilization of the waste heat. 83 designates the converter, 84 the regenerator and 85 a vertical lift for carrying out the circulation of the reactant between the converter and the regenerator. The construction and operation of the converter 83 and the regenerator 84 is the same as that of the converter 1 and regenerator 4 (Figs. 1 to 3) or converters 72 and regenerators 73 (Fig. 4) and therefore need not to be described. An essential difference, however, consists in that in the examples according to Figs. 1 to 4 the gas to be converted passes merely through the converter, whilst according to Fig. 5 the gas passes in succession through the regenerator 84 and then the converter 83.

In the generator 81 water gas is produced in alternating periods, viz. in water gas generating periods and hot air blast periods, in a known manner.

The blast period is effected as follows. The primary air is supplied from the compressor 86 to the generator 81 and the hot blast gases flow from the generator through the conduit 87 to the regenerator 84 which serves instead of the usual combustion chamber (ignition chamber, heat storage, carburettor) to burn the blast gases. The air required for this burning process is supplied through the pipe 88 and enters into the regenerator 84 together with the blast gases. The regenerator does not contain, as does a usual combustion chamber, a refractory heat storage checker-work, but the heat storage material is represented by the reactant contained within the regenerator. By burning the blast gases in the regenerator 84 the reactant is regenerated, that is to say, it is heated up to a temperature at which the $CO_2$ absorbed by the reactant during the gas conversion in the converter 83 is driven out of the reactant. The hot combustion products of the blast gases flow from the regenerator 84 through the conduit 89 into the waste heat-steam boiler 82 wherein the sensible heat of these products is utilized for the production of steam. The cooled gases escape from the boiler 82 through the chimney 90 into the open air.

The water gas generating period now following is effected as follows. The water gas produced in the generator 81 flows through the conduit 87 into the regenerator 84 in which it is preheated by the hot reactant and therefrom through the conduit 91 to the converter 83. In the converter 83 the water gas is converted into H and $CO_2$ in the presence of the reactant and of steam supplied through the pipe 92. The converted gas flows from the converter 83 through the cooling device 94 to the users. The steam required for the water gas generation is supplied to the generator 81 through the branch pipe 93. As it will be seen, the principle of the present invention, that is to say the circulation of the reactant between the converter and the regenerator is used in this process again.

What we claim is:

1. A continuous process for depoisoning gases containing carbon monoxide by converting the carbon monoxide into a mixture of carbon dioxide and hydrogen in the presence of steam and of a reactant consisting essentially of ankerite and for removing carbon dioxide from the mixture, which comprises converting the carbon monoxide into carbon dioxide and hydrogen in a conversion chamber containing the ankerite, regenerating the ankerite, as soon as it becomes inactive as regards the absorption of $CO_2$, by heating the ankerite in a regeneration chamber, repeatedly intermittently circulating the ankerite in a hot state between said chambers, the temperature of the reactant during said circulation being maintained between 400–800° C.

2. A continuous process for depoisoning gases containing carbon monoxide by converting the carbon monoxide into a mixture of carbon dioxide and hydrogen in the presence of steam and of a reactant consisting essentially of ankerite and for removing carbon dioxide from the mixture, which comprises converting the carbon monoxide into carbon dioxide and hydrogen in a conversion chamber containing the ankerite, regenerating the ankerite, as soon as it has become inactive as regards the absorption of $CO_2$, by heating the same to the regeneration temperature of ankerite in a regeneration chamber, repeatedly intermittently circulating the ankerite in a hot state between said chambers, the temperature of the reactant during said circulation being maintained between 400–800° C., cooling the ankerite after each regeneration thereof and before entering into the conversion chamber to the conversion temperature by transferring its excess heat to a cooling medium, and utilizing the heat thus transferred to the cooling medium for regenerating the ankerite.

3. A continuous process for depoisoning gases containing carbon monoxide by converting the carbon monoxide into a mixture of carbon dioxide and hydrogen in the presence of steam and of a reactant consisting essentially of ankerite and removing carbon dioxide from the mixture, which comprises converting the carbon monoxide into carbon dioxide and hydrogen in a conversion chamber containing the ankerite, regenerating the ankerite, as soon as it becomes inactive as regards the absorption of $CO_2$, by heating the same in a regeneration chamber, repeatedly intermittently circulating the ankerite in a hot state between said chambers, while maintaining the temperature of the reactant during said circulation between 400–800° C., indirectly cooling said conversion chamber by a heat transfer to a cooling medium so as to maintain the conversion temperature constant, and utilizing the exothermal heat of the conversion process for regenerating the ankerite.

4. A continuous process for depoisoning gases containing carbon monoxide by converting the carbon monoxide into a mixture of carbon dioxide and hydrogen in the presence of steam and of a reactant consisting essentially of ankerite and for removing carbon dioxide from the mixture, which comprises passing the gas to be converted alternately in opposite directions through a conversion chamber containing the reactant so as to first preheat the gas by means of this reactant and then to convert the gas, regenerating the reactant, as soon as it becomes inactive due to absorption of $CO_2$, by heating the same in a regeneration chamber, repeatedly intermittently circulating the reactant in a hot state between said chambers, the temperature of the reactant during said circulation being maintained between 400–800° C.

5. A continuous process for depoisoning gases containing carbon monoxide by converting the carbon monoxide into a mixture of carbon dioxide and hydrogen in the presence of steam and of a reactant consisting essentially of ankerite and for removing carbon dioxide from the mixture, which comprises producing hot blast gases in a water gas generator, burning these blast gases in a regeneration chamber containing the reactant to regenerate the latter as soon as it becomes inactive due to absorption of $CO_2$, alternately producing water gas in the said generator, passing this water gas through said regeneration chamber to preheat the water gas, and then through a conversion chamber containing the regenerated reactant to convert the water gas into carbon dioxide and hydrogen, intermittently circulating the reactant in a hot state between said chambers, and maintaining the temperature of the reactant during said circulation within 400–800° C.

FRANZ BÖSSNER.
CARL MARISCHKA.